(12) United States Patent
Meyer et al.

(10) Patent No.: US 8,849,109 B2
(45) Date of Patent: Sep. 30, 2014

(54) FAULT ISOLATION AND PROVISIONING FOR OPTICAL SWITCHES

(75) Inventors: Gerhard Meyer, Eggolsheim (DE); Wolfgang Thomas, Nuremberg (DE)

(73) Assignee: Alcatel Lucent, Boulogne-Billancourt (FR)

( * ) Notice: Subject to any disclaimer, the term of this patent is extended or adjusted under 35 U.S.C. 154(b) by 1392 days.

(21) Appl. No.: 11/394,259

(22) Filed: Mar. 30, 2006

(65) Prior Publication Data
US 2007/0237521 A1 Oct. 11, 2007

(51) Int. Cl.
*H04J 14/00* (2006.01)
*H04Q 11/00* (2006.01)
*H04B 10/079* (2013.01)

(52) U.S. Cl.
CPC ....... *H04B 10/0791* (2013.01); *H04Q 11/0062* (2013.01); *H04B 10/07955* (2013.01); *H04Q 2011/0039* (2013.01); *H04Q 2011/0081* (2013.01); *H04Q 2011/0079* (2013.01); *H04Q 2011/0024* (2013.01)
USPC .................. 398/12; 398/10; 398/11; 398/14; 398/15; 398/17; 398/18; 398/19

(58) Field of Classification Search
USPC ............................... 398/10–12, 14, 15, 17–19
See application file for complete search history.

(56) References Cited

U.S. PATENT DOCUMENTS

| | | | | |
|---|---|---|---|---|
| 5,546,403 A * | 8/1996 | Yamamoto et al. | ........... | 714/716 |
| 5,642,217 A * | 6/1997 | Carbone et al. | ................. | 398/37 |
| 5,757,774 A * | 5/1998 | Oka | .............................. | 370/242 |
| 5,781,535 A * | 7/1998 | Russ et al. | ..................... | 370/248 |
| 5,825,516 A * | 10/1998 | Walsh | .............................. | 398/40 |
| 5,903,370 A * | 5/1999 | Johnson | ............................. | 398/4 |
| 5,920,414 A * | 7/1999 | Miyachi et al. | ................. | 398/14 |
| 5,936,942 A * | 8/1999 | McNeley et al. | ............. | 370/244 |
| 5,955,959 A * | 9/1999 | Taki et al. | ....................... | 340/3.2 |
| 6,023,452 A * | 2/2000 | Shiragaki | ....................... | 370/227 |
| 6,202,082 B1 * | 3/2001 | Tomizawa et al. | ............ | 709/201 |
| 6,262,820 B1 * | 7/2001 | Al-Salameh | ..................... | 398/12 |
| 6,304,347 B1 * | 10/2001 | Beine et al. | ...................... | 398/38 |
| 6,317,231 B1 * | 11/2001 | Al-Salameh et al. | .......... | 398/34 |
| 6,327,677 B1 * | 12/2001 | Garg et al. | ....................... | 714/37 |
| 6,411,598 B1 * | 6/2002 | McGlade | ....................... | 370/217 |
| 6,414,940 B1 * | 7/2002 | Shah et al. | ..................... | 370/242 |
| 6,433,900 B1 * | 8/2002 | Kuroyanagi et al. | ........... | 398/19 |
| 6,449,068 B1 * | 9/2002 | Turner et al. | ..................... | 398/38 |
| 6,515,777 B1 * | 2/2003 | Arnold et al. | .................... | 398/97 |
| 6,545,779 B1 * | 4/2003 | Liu et al. | .......................... | 398/14 |
| 6,598,092 B2 * | 7/2003 | Tomizawa et al. | ............ | 709/251 |
| 6,601,185 B1 * | 7/2003 | Bass et al. | ..................... | 714/4.12 |
| 6,671,256 B1 * | 12/2003 | Xiong et al. | .................... | 370/230 |
| 6,721,502 B1 * | 4/2004 | Al-Salameh et al. | ............ | 398/3 |
| 6,724,769 B1 * | 4/2004 | Sang | ............................. | 370/429 |
| 6,778,778 B1 * | 8/2004 | Richards et al. | ................ | 398/14 |
| 6,785,473 B1 * | 8/2004 | Sasaki et al. | .................... | 398/79 |

(Continued)

*Primary Examiner* — Danny Leung (74) *Attorney, Agent, or Firm* — Wall & Tong, LLP (57) ABSTRACT

The present invention includes method and apparatus for storing provisioned information within the optical switches and retrievable by every controller. The optical switches perform failure isolation according to their provisioning information. The optical switches monitor each channel for loss of signal. The provisioning information is shared autonomously between the optical switches allowing the switches to retrieve the provisioning information of the network topology from any other optical switch in the network. Fault isolation is done by the optical switch on the level of optical switch provisioning following the paradigm of "single alarm for single fault," thus avoiding alarm floods and ambiguous alarms, thereby saving the operator time and money.

19 Claims, 4 Drawing Sheets

(56) References Cited

U.S. PATENT DOCUMENTS

| | | | |
|---|---|---|---|
| 6,813,407 B2* | 11/2004 | Ramaswami et al. | 385/16 |
| 6,895,183 B2* | 5/2005 | Shimomura et al. | 398/34 |
| 6,904,438 B2* | 6/2005 | Harris et al. | 1/1 |
| 6,933,852 B2* | 8/2005 | Kitajima et al. | 340/635 |
| 6,963,995 B2* | 11/2005 | Fee | 714/4 |
| 7,099,583 B2* | 8/2006 | Schafer et al. | 398/56 |
| 7,106,965 B2* | 9/2006 | Suzuki | 398/31 |
| 7,113,699 B1* | 9/2006 | Bhate et al. | 398/15 |
| 7,133,611 B2* | 11/2006 | Kaneko | 398/30 |
| 7,142,504 B1* | 11/2006 | Uzun | 370/224 |
| 7,197,241 B2* | 3/2007 | Weston-Dawkes et al. | 398/5 |
| 7,209,655 B2* | 4/2007 | Peddanarappagari et al. | 398/38 |
| 7,209,656 B2* | 4/2007 | Peddanarappagari et al. | 398/38 |
| 7,212,742 B2* | 5/2007 | Peddanarappagari et al. | 398/38 |
| 7,280,470 B2* | 10/2007 | Shiragaki et al. | 370/223 |
| 7,302,176 B2* | 11/2007 | Sakano et al. | 398/5 |
| 7,327,954 B2* | 2/2008 | Palacharla et al. | 398/30 |
| 7,340,170 B2* | 3/2008 | Park et al. | 398/67 |
| 7,394,981 B2* | 7/2008 | Manifold | 398/17 |
| 7,406,260 B2* | 7/2008 | MacDonald | 398/1 |
| 7,421,197 B2* | 9/2008 | Palacharla et al. | 398/5 |
| 7,426,179 B1* | 9/2008 | Harshavardhana et al. | 370/219 |
| 7,430,373 B2* | 9/2008 | Yamashita | 398/83 |
| 7,474,850 B2* | 1/2009 | Sadananda et al. | 398/2 |
| 7,499,646 B2* | 3/2009 | Emongkonchai | 398/2 |
| 7,505,683 B1* | 3/2009 | Lemieux et al. | 398/4 |
| 7,532,570 B2* | 5/2009 | Uzun | 370/224 |
| 7,609,964 B2* | 10/2009 | Peddanarappagari et al. | 398/38 |
| 7,633,878 B2* | 12/2009 | Giorgetta et al. | 370/244 |
| 2001/0026384 A1* | 10/2001 | Sakano et al. | 359/124 |
| 2001/0038471 A1* | 11/2001 | Agrawal et al. | 359/110 |
| 2001/0040711 A1* | 11/2001 | Al-Salameh et al. | 359/128 |
| 2002/0105694 A1* | 8/2002 | DeGrange et al. | 359/127 |
| 2002/0131116 A1* | 9/2002 | Shimomura et al. | 359/124 |
| 2002/0191247 A1* | 12/2002 | Lu et al. | 359/124 |
| 2003/0039207 A1* | 2/2003 | Maeda et al. | 370/216 |
| 2004/0120706 A1* | 6/2004 | Johnson et al. | 398/10 |
| 2004/0151172 A1* | 8/2004 | Notani et al. | 370/380 |
| 2004/0243888 A1* | 12/2004 | Ngo | 714/704 |
| 2005/0041575 A1* | 2/2005 | Kam et al. | 370/216 |
| 2005/0041601 A1* | 2/2005 | Kam et al. | 370/258 |
| 2005/0122967 A1* | 6/2005 | Nagasawa | 370/380 |
| 2006/0056843 A1* | 3/2006 | Fee et al. | 398/19 |
| 2007/0223918 A1* | 9/2007 | Kakizaki et al. | 398/12 |
| 2007/0237521 A1* | 10/2007 | Meyer et al. | 398/19 |

* cited by examiner

FAULT ISOLATION AND PROVISIONING FOR OPTICAL SWITCHES

FIELD OF THE INVENTION

The invention is related to the field of optical communications, and in particular, for fault isolation and provisioning for optical switches.

BACKGROUND OF THE INVENTION

In a conventional fiber-optic communication system, optical switches store their own local switching data. Network-wide provisioning data is not stored within the optical switches and, therefore, not generally available at the operator's terminal (i.e., craft terminal). When there is a fault in the network, a network management system tries to identify the root cause of the fault using alarm information received from the optical switches (and other elements in the network). Because the optical switches do not have an unlimited number of alarm detectors, such means of isolating and identifying fault is very imprecise.

SUMMARY

Various deficiencies of the prior art are addressed by the present invention for enhanced per wavelength fault isolation and provisioning of optical switches. It is desirable to have unambiguous alarms available to the operator's terminals (i.e., craft terminals).

In accordance with one embodiment of the invention, each optical switch includes an element controller. The provisioning information is stored within the optical switches and is retrieved by every element controller. The optical switches perform failure isolation according to their provisioning data. The optical switches monitor each channel for loss of signal (LOS). The provisioning data is shared autonomously between the optical switches, allowing the switches to retrieve the provisioning information of the network topology from any other optical switch in the network. Fault isolation is effected on the level of optical switch provisioning following the paradigm of "single alarm for single fault," thus avoiding alarm floods and ambiguous alarms, saving the operator time and money.

The invention further provides other methods and system elements that implement various aspects, embodiments, and features of the invention, as described in further detail below. The foregoing, together with other aspects of this invention, will become more apparent when referring to the following specification, claims, and accompanying drawings.

BRIEF DESCRIPTION OF THE DRAWINGS

The teachings of the present invention can be readily understood by considering the following detailed description in conjunction with the accompanying drawings, in which.

However, the appended drawings illustrate only exemplary embodiments of this invention and are therefore not to be considered limiting of its scope, for the invention admits to other equally effective embodiments.

DETAILED DESCRIPTION OF THE INVENTION

The present invention is generally described within the context of fiber-optic communication systems. It will be appreciated by those skilled in the art that the invention may be utilized within the context of an optical add/drop multiplexer (OADM) within an optical switch in an optical network. Other provisionable elements within the communication systems also benefit from the invention.

Figure 1:
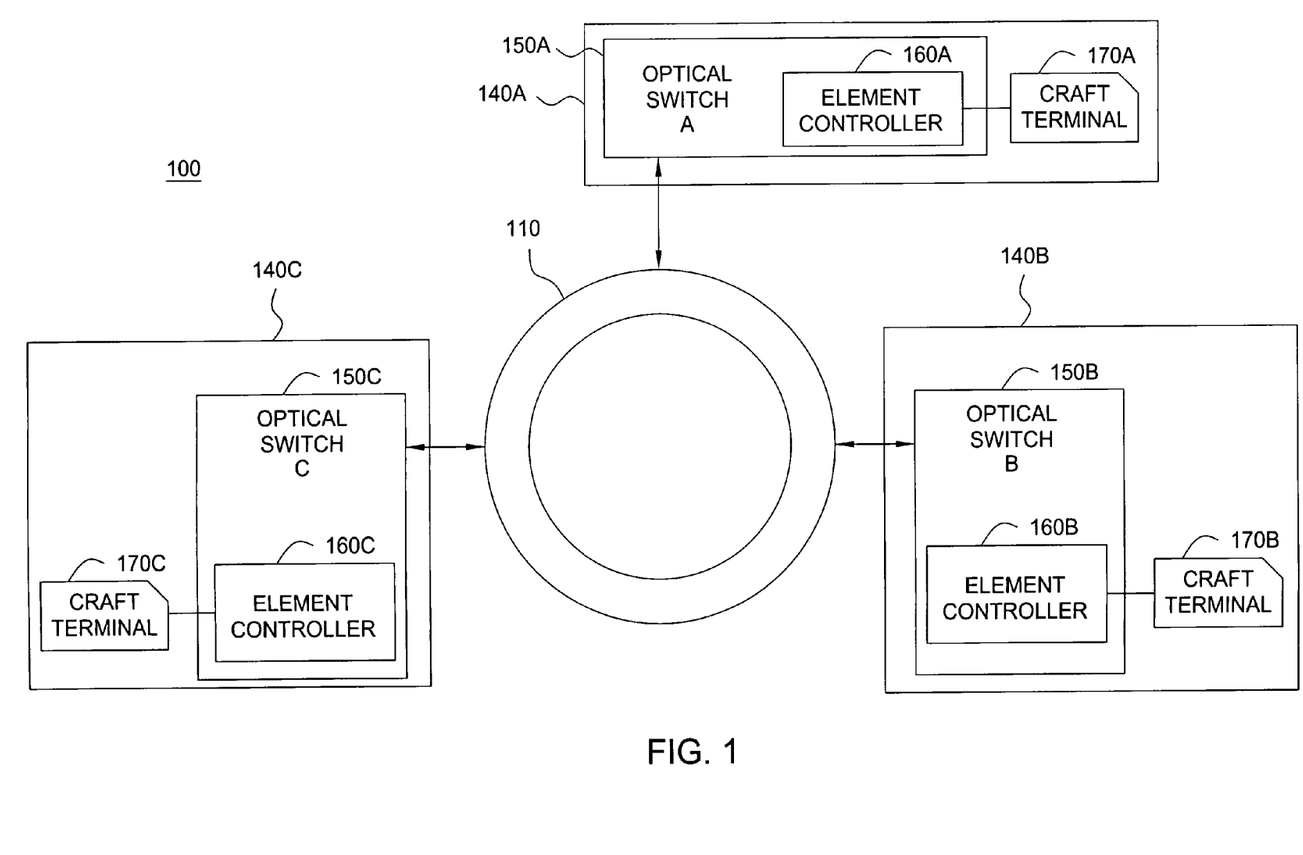
FIG. 1 depicts a high-level block diagram of a fiber-optic communication system suitable for use with the present invention.

FIG. 1 depicts a high-level block diagram of a fiber-optic communication system suitable for use with the present invention. In one embodiment, the communication system 100 includes a communication network 110 having a plurality of optical nodes 140A, 140B and 140C.

The network 110 transports information between optical nodes. In one embodiment, the network 110 is a ring network structure. In another embodiment, the network 110 topology comprises non-ring networks (not shown) such as a mesh, star or other types of network structures. In a further embodiment, the network includes a hybrid network topology having a plurality of different types of network structures.

The plurality of optical nodes 140A, 140B and 140C are interfaced with the network 110 for transmitting and receiving optical channels. Each optical node has substantially the same structure. Each channel is composed of a respective wavelength of light. Information is modulated onto the channel using a modulation technique adapted to function with other components of the communication system such as phase shift keying (PSK), on-off-keying (OOK), or any other modulation techniques. Each optical node 140A, 140B or 140C includes an optical switch 150A, 150B or 150C, an element controller 160A, 160B or 160C and a craft terminal 170A, 170B or 170C, respectively. In one embodiment, the optical node 140A receives, switches and transmits wavelength division multiplexing (WDM) optical signals. The optical node allows for fault detection and alarm generation. The node also allows local maintenance staff to monitor and manage components within the communication system by utilizing the craft terminal.

The optical switch 150A performs channel switching for the channels traveling on the network 110. The optical switch 150A connects the network 110 to another network or a destination terminal (not shown). In one embodiment, the optical switch 150A includes an optical add/drop multiplexer, OADM (not shown). The optical switch is described in detail in FIG. 2 below. In another embodiment, the switch 150A includes other optical and electrical elements having hardware and software components to assist in channel switching. In one embodiment, the optical switch includes detectors to monitor the optical signal strength of the channels being received and transmitted. The detectors are explained in detail in FIG. 2 below.

The element controller 160A monitors and maintains the network node 140 A. The element controller is connected to the craft terminal 170A via a management interface. The controller 160A receives information from the detectors in the optical switch 150A of its corresponding node as well as other detectors in other optical switches 150B and 150C. The element controller 160A also receives supervisory information including neighboring information from other nodes in the network, i.e., 140B and 140C, for routing and channel provisioning. In one embodiment, supervisory information for the element controller 160A is transmitted by in-band signaling. In another embodiment, the supervisory information is received by the element controller 160A using out-of-band signaling.

The craft terminal 170A allows the operator to monitor and control different components of the communication network via the optical switch 140A. The craft terminal includes a craft interface. The craft interface allows the management staff to monitor the status of the components of the network and to perform system management functions. In one embodiment, the craft interface is a web-based interface. In another embodiment, the craft interface includes a Front Panel Module (FPM).

Figure 2:
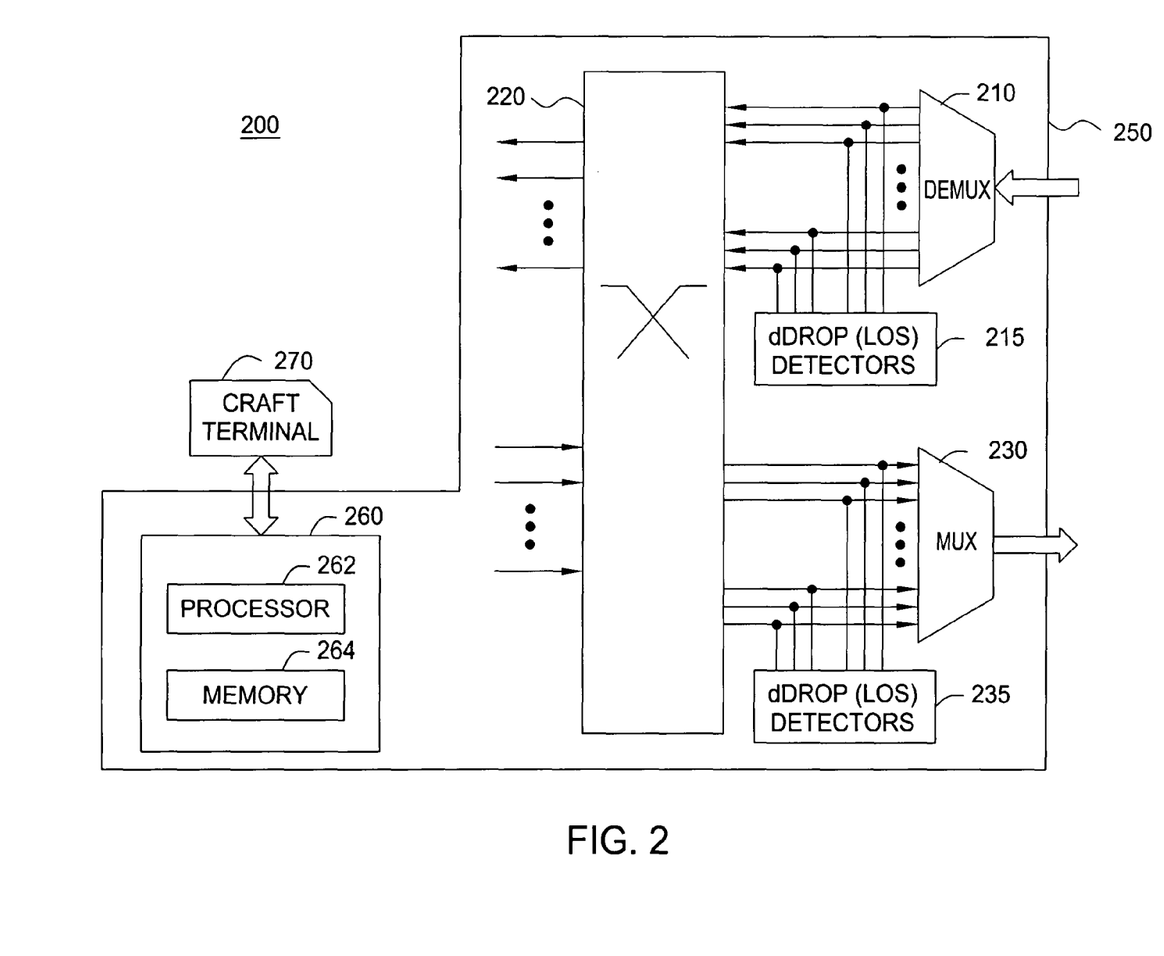
FIG. 2 depicts a high-level block diagram of a fiber-optic communication node suitable for use with the present invention.

FIG. 2 depicts a high-level block diagram of an optical node suitable for use with the present invention. The optical node includes an optical switch 250, an element controller 260 and a craft terminal 270.

The optical switch 250 includes a demultiplexer 210, a set of detectors 215 optically coupled to the demultiplexer for detecting loss of signal (LOS), an optical cross-connect 220, a multiplexer 230 and a set of detectors 235 optically coupled to the multiplexer 230 for detecting LOS at the multiplexer 230.

The optical switch 250 is capable of adding a channel, dropping a channel or allowing a channel to pass-through the optical switch 250. If a channel is to be added, then the cross-connect 220 routes the channel to the multiplexer 230 of the switch 250 to be multiplexed for transport on the network. If a channel is to be dropped, then the WDM signal is demultiplexed for the channel at the demultiplexer 210 and the cross-connect 220 routes the demultiplexed channel to be terminated by the optical switch. If a channel is to be through-connected, the WDM signal is demultiplexed by the demultiplexer 210 for that channel. The channel is routed by the cross-connect 220 to the multiplexer 230 and multiplexed with other channels by the multiplexer 230 for transmission on the optical network. In another embodiment, the through-connected channel bypasses the optical switch completely without being demultiplexed and multiplexed in order to increase the efficiency of the node.

The LOS detector 215 at the demultiplexer 210 monitors every channel that is demultiplexed by the demultiplexer 210. If a channel that is demultiplexed has no signal (i.e., a wavelength associated with an expected channel is not present), then the LOS detector 215 transmits a LOS signal to the element controller 260. In one embodiment, a LOS signal is an alarm signal informing the element controller 260 that a specific channel does not have a recognizable signal. The LOS detector 235 operates essentially the same way as LOS detector 215. The LOS detector 235 at the multiplexer 230 monitors every channel that is to be multiplexed by the multiplexer 230. If a channel that is to be added has no recognizable signal, then the LOS detector 235 transmits the LOS signal to the element controller 260, which informs the element controller 260 that a specific channel does not have a recognizable signal. In another embodiment, the switch includes an optical to electrical converter, and the detecting and switching are performed electrically.

The element controller 260 receives information from the neighboring nodes, including LOS signals from other nodes, as well as alarm signals from the detectors 215 and 235 of its node. It also has a section termination function to determine if the channels to be dropped have been properly terminated by the optical switch 250. The section termination function generates alarms by determining whether a signal has been properly terminated at the termination ports of the switch. At least one detector (not shown) at the termination ports generates a LOS alarm if the termination ports have no recognizable terminated signal. The element controller 260 includes a processor 262 and a memory 264.

Each element controller 260 of the nodes of the network operates essentially the same. The element controller 260 transmits the identity of its node to its neighboring nodes to the East and the West. The element management system 260 also receives identity information from its neighbors to the East and the West. This process allows all the nodes to become aware of the neighboring switches connected via the multicolor interfaces. In one embodiment, the process is performed manually using a network management system or the element controller. In another embodiment, the process is performed via automatic neighbor detection. In a further embodiment, neighbor information is transmitted such that all the switches know the topology of the network.

The element controller 260 provisions the channels that are to be added, dropped, or through-connected. The element controller 260 also receives the alarm information from its corresponding optical switch. The element controller autonomously distributes its provisioning information and the alarm information with respect to the loss of signal defects detected per channel wavelength to the neighboring element management system so that every node is aware of the complete add/drop provisioning information and all loss of signal defects detected by all connected optical nodes. The distribution of data is done on various channels. In one embodiment, the channels include supervisory channels, DCN channels, or any other suitable data connection. In another embodiment, the channels are transmitted via in-band and/or out-of-band connections.

The craft terminal 270 includes a craft interface that allows the operator to monitor the status of the switch and perform system management functions. The craft terminal 270 provides the operator the ability to monitor and control different components of the communication network via the element controller 260. In one embodiment, the craft interface is a web-based interface. In another embodiment, the craft interface includes a Front Panel Module (FPM). Other ways to monitor and manage the network are also possible.

Figure 3:
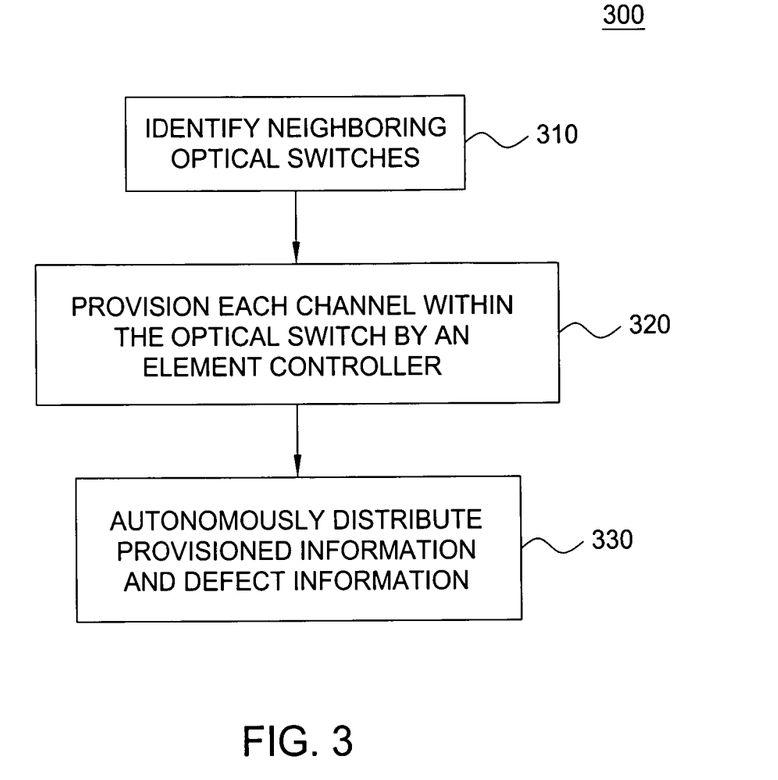
FIG. 3 depicts a flow diagram of a method for distributing information according to one embodiment of the present invention.

FIG. 3 depicts a flow diagram of a method for distributing information according to one embodiment of the present invention. A node of the network receives neighbor identity information from the neighboring nodes to the East and West of the node. The node also transmits its identity to the neighboring nodes located to the East and the West of the node. The element controller of each node transmits and receives the provisioning information. The identity of the neighbor nodes and provisioning information at each node are stored in a memory 264 and processed by the processor 262 of the elemental controller 260. The element controller 260, utilizing the neighboring nodes' identity information, learns the topology of the network 310. The element controller also provisions each channel to be added, dropped and through-connected by the switch within the node 320. The element controller stores the provision information as well as any defect information and distributes autonomously that information to the other nodes 330.

Figure 4:
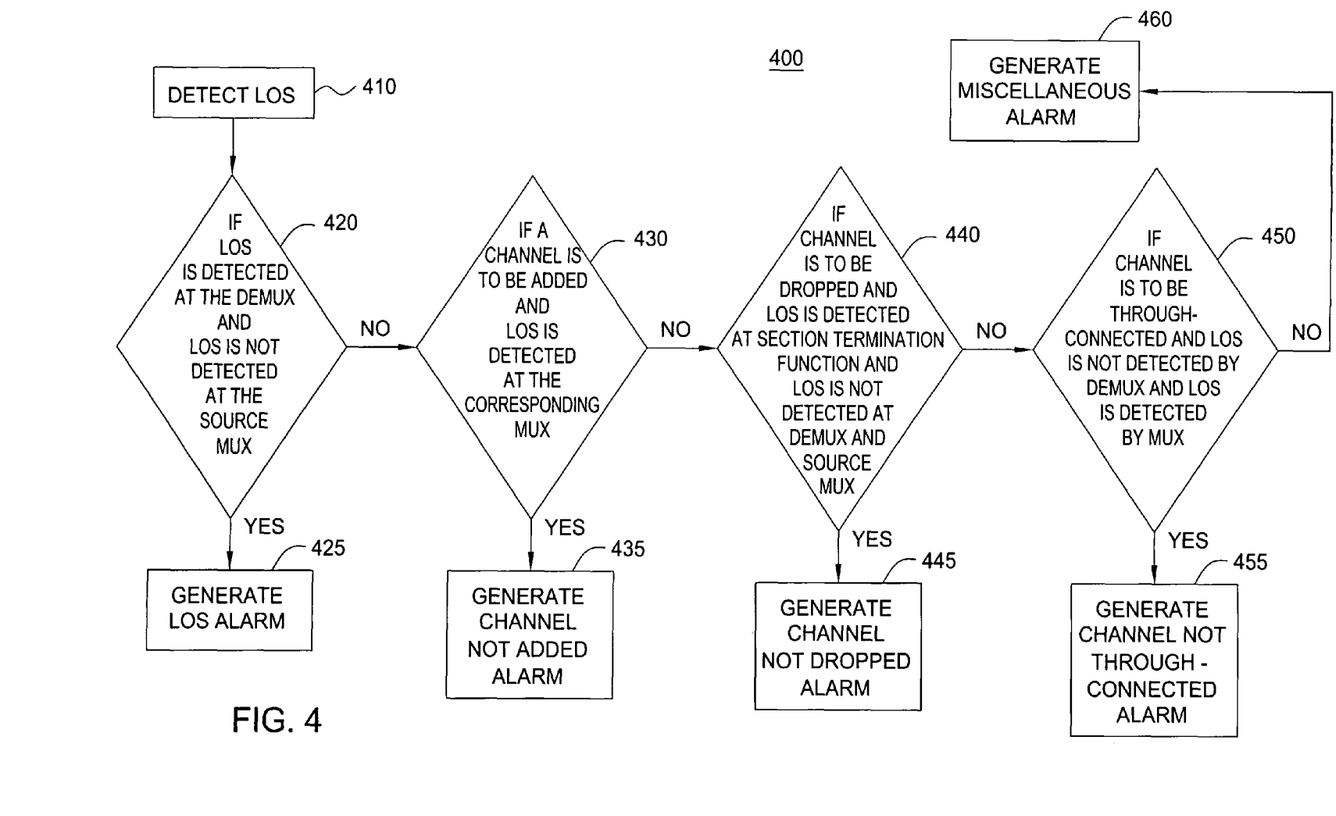
FIG. 4 depicts a flow diagram of a method for generating specific alarms for specific faults in the communication system according to an embodiment of the invention.

FIG. 4 depicts a flow diagram of a method for generating specific alarms for specific defects for a channel in the communication system according to an embodiment of the invention. In one embodiment, the present invention generates at least five different types of alarms for the defects of the communication system. A "loss of signal (LOS)" alarm, a "channel not added" alarm, a "channel not dropped" alarm, a "channel not through-connected" alarm, and a miscellaneous alarm. These alarms inform the other nodes of the network as well as any centralized network management system specific errors located at each node. Every node performs substantially similar functions. Each node is able to generate all the alarms for the communication system. In one embodiment, the processing and generation of these alarms are performed in the processor of the element controller. In another embodiment, the processing and generation of these alarms are located at a remote location separate from the switching node.

At step 410, the element controller at the node receives an alarm, which signifies either LOS detector 215, the LOS detector 235, the LOS detector connected to the section termination function, or a combination the above mentioned detectors have detected fault. In one embodiment, every element controller receives every alarm of the communication system, and each element controller stores the alarms in its memory. The processor at each element controller determines and assists in generating the appropriate alarms depending on the source of the LOS signals.

At step 420, the processor of the element controller determines if one of the alarms stored in the memory of the node is a LOS signal from the channel of a demultiplexer of the node. If a LOS signal for the channel of the demultiplexer is detected, then the processor checks if a LOS signal for that channel is also detected at a multiplexer located at a source of the transmission of that channel. If the LOS signal is not detected for the channel at the multiplexer of the source node, then that signifies the channel was lost between the source multiplexer and destination demultiplexer. In response to the lost signal, a LOS alarm is generated and is transmitted to the other nodes 425. If the above conditions are not met, then the processor goes to the next step.

At step 430, the processor, using the provisioning information located in the memory of the element controller, determines if the channel is provisioned to be added. If the channel is to be added, then the processor checks its corresponding memory for a LOS signal for that channel at a multiplexer of the node. If the processor detects that LOS signal, then it is able to determine that the channel was suppose to be added, but that channel was not multiplexed onto the communication network at the multiplexer of its node. Thus, the element controller generates the "channel not added" alarm 435 and transmits that alarm to the other nodes of the communication system. If LOS signal is not detected for that channel at the multiplexer, then the channel has been successfully added and the processor goes to the next step.

At step 440, the processor determines if a channel has been dropped without errors. The processor checks a database of provisioning information located in the element controller as described in FIG. 3 above to determine if a channel is provisioned to be dropped. If a channel is to be dropped, then the processor checks its corresponding memory for a LOS signal of that channel at the section termination function. If LOS signal is detected at the section termination function, then the channel has not been properly terminated at the switch. Then, the processor checks if a LOS signal is detected at the demultiplexer of the node and if a LOS signal is detected at the source multiplexer at the source node where the channel originated. If there is no LOS signal at the demultiplexer of the node for that channel and no LOS signal at the source multiplexer at the source node of the channel, then it signifies the channel has been received properly, but a termination error occurred. Therefore, the element controller of the node with the termination fault generates a "channel not dropped alarm" 445 and transmits that alarm to the other nodes. If the channel is not to be dropped, the LOS signal is not detected at the section termination function, or the LOS signal is detected at the demultiplexer of the destination node or the multiplexer of the source node, then the processor moves on to the next step 450.

At step 450, the element controller determines if a channel is properly through-connected. The processor, using the provisioning information located in the memory of the element management system, checks if a channel is being through-connected. If the switch is through-connecting the channel, then the element controller has that provisioning information as described in FIG. 3 above. If a channel is to be through-connected, then the processor checks its corresponding memory for the LOS signal for the through-connect channel at the demultiplexer of the node. If LOS signal is not detected, then the channel has been demultiplexed properly at the switch. The processor then checks if a LOS signal is detected at the multiplexer of the node. If LOS signal is detected for the multiplexer, then that signifies the demultiplexed channel has not been properly multiplexed back into the WDM signal. Thus, no LOS signals for the demultiplexer and a LOS signal at the multiplexer for the through-connect channel signifies a through-connect error. The element controller generates a "channel not through-connected" alarm 455 for this fault condition. If the channel is not to be through-connected, or LOS signal is detected at the demultiplexer, or LOS signal is not detected at the multiplexer in this step, then the miscellaneous alarm is generated 460 signifying something other than the above four fault conditions occurred that cause the initial detection of the LOS signal at step 410.

Other alarms using other combinations of LOS signals are also possible. In another embodiment, these steps can operate independently, in parallel within the processor, or in any order. In a further embodiment, each step is performed by a dedicated processor (i.e., application specific integrated circuit, ASIC).

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for fault isolation at an optical switch in an optical network having a plurality of optical switches, each of said optical switches supporting a plurality of channels, each of said optical switches storing network topology and provisioning information, the method comprising:

monitoring, at a first optical switch, a plurality of wavelength division multiplexing (WDM) channels to detect whether any of said channels is associated with a loss of signal (LOS) channel defect condition;

determining one or more faults using detected LOS channel defect conditions, stored network topology and provisioning information, and information about LOS channel defect conditions received from neighboring nodes;

transmitting, toward neighborhood nodes via a control channel, information including said detected LOS channel defect conditions and any provisioning updates; and further determining whether any channel is associated with one or more of a channel not added fault, a channel not dropped fault and a channel not through connected fault, wherein any determined channel not added fault, channel not dropped fault and channel not through connected fault is included within said information transmitted toward neighborhood nodes via said control channel.

2. The method of claim 1, further comprising using said one or more determined faults to identify a root cause for the fault in the optical network.

3. The method of claim 1, further comprising transmitting, toward an element controller via said control channel, information including said one or more determined faults, said detected LOS channel defect conditions and any provisioning updates.

4. The method of claim 1, further comprising:
detecting, for each of a plurality of output channels, whether a loss of signal (LOS) condition has occurred, and storing detected LOS information at the optical switch; and
multiplexing the output channels into a WDM signal.

5. The method of claim 1, wherein the monitoring is performed using a section termination function.

6. The method of claim 1, wherein said method is executed at each of the plurality of optical switches within the optical network such that only one alarm signal is generated for each LOS fault condition.

7. The method of claim 1, further comprising generating a channel not added alarm signal if the provisioning information includes a channel to be added and a LOS channel defect condition is associated with a corresponding output channel.

8. A method for fault isolation at an optical switch in an optical network having a plurality of optical switches, each of said optical switches supporting a plurality of channels, each of said optical switches storing network topology and provisioning information, the method comprising:
monitoring, at a first optical switch, a plurality of wavelength division multiplexing (WDM) channels to detect whether any of said channels is associated with a loss of signal (LOS) channel defect condition;
determining one or more faults using detected LOS channel defect conditions, stored network topology and provisioning information, and information about LOS channel defect conditions received from neighboring nodes;
transmitting, toward neighborhood nodes via a control channel, information including said detected LOS channel defect conditions and any provisioning updates; and
generating a channel not dropped alarm signal if the provisioning information includes a channel to be dropped and a LOS channel defect condition is associated with a corresponding channel at a section termination function and no LOS channel defect condition is associated with the corresponding channel at both a destination demultiplexer and a source multiplexer.

9. An optical node in a communication network, the optical node comprising:
a demultiplexer, for demultiplexing a received wavelength division multiplexing (WDM) signal into a plurality of first channels;
a first loss of signal (LOS) detector, for monitoring each of the first channels for a loss of signal (LOS) condition;
a multiplexer, for multiplexing a plurality of second channels into a WDM signal for transmission;
a second loss of signal (LOS) detector, for monitoring each of the second channels for a loss of signal (LOS) condition; and
an element controller, for storing network topology information, provisioning information, and LOS information associated with LOS conditions detected by the first and second LOS detectors, for determining one or more faults using detected LOS channel defect conditions, stored provisioning information and information about LOS channel defect conditions received from neighboring nodes, and for transmitting, toward neighborhood nodes via a control channel, information including said detected LOS channel defect conditions and any provisioning updates, and for further determining whether any channel is associated with one or more of a channel not added fault, a channel not dropped fault and a channel not through connected fault, wherein any determined channel not added fault, channel not dropped fault and channel not through connected fault is included within said information transmitted toward neighborhood nodes via said control channel.

10. The optical node of claim 9, wherein at least one other node includes a neighboring optical node.

11. The optical node of claim 10, further comprising a craft terminal.

12. The optical node of claim 10, wherein the element controller includes a database for storing the network topology information, provisioning information, and LOS information.

13. The optical node of claim 12, wherein each node within the communications network is adapted to generate an alarm corresponding to a detected faults only when the respective node is the first node to detect the fault.

14. The optical node of claim 13, wherein a local controller identifies a root cause of a fault using at least the LOS information and the provisioning information.

15. An optical network, comprising a plurality of nodes, wherein at least some of the plurality of nodes comprise:
a demultiplexer, for demultiplexing a received wavelength division multiplexing (WDM) signal into a plurality of first channels;
a first loss of signal (LOS) detector, for monitoring each of the first channels for a loss of signal (LOS) condition;
a multiplexer, for multiplexing a plurality of second channels into a WDM signal for transmission;
a second loss of signal (LOS) detector, for monitoring each of the second channels for a loss of signal (LOS) condition; and
an element controller, for storing network topology information, provisioning information, and LOS information associated with LOS conditions detected by the first and second LOS detectors, for determining one or more faults using detected LOS channel defect conditions, stored provisioning information and any received neighboring node information, and for transmitting, toward neighborhood nodes via a control channel, information including said one or more determined faults, said detected LOS channel defect conditions and any provisioning updates, and for further determining whether any channel is associated with one or more of a channel not added fault, a channel not dropped fault and a channel not through connected fault, wherein any determined channel not added fault, channel not dropped fault and channel not through connected fault is included within said information transmitted toward neighborhood nodes via said control channel.

16. The optical network of claim 15, wherein the optical network is a ring network.

17. The optical network of claim 15, further comprising a craft terminal, wherein the craft terminal comprises a craft interface capable of accessing the network topology information, provisioning information and the LOS information.

18. The optical network of claim 17, wherein the craft interface allows for the management of network resources associated with a root cause of the fault in the optical network.

19. A method for provisioning and fault isolation at a node in an optical network comprising a plurality of nodes, said nodes exchanging data via optical channels within wavelength division multiplexing (WDM) signals, said nodes exchanging network topology information, provisioning information and channel defect information via a control channel, at least some of said nodes including an optical switch for selectively processing WDM channels, said method comprising:

identifying, via control channel interaction, one or more neighboring nodes including optical switches;

provisioning, via the control channel, one or more of the optical channels supported by the optical switches;

receiving, from the control channel, any alarm information indicative of a loss of signal (LOS) channel defect condition at a neighboring node optical switch;

storing provisioning information and alarm information for each neighboring node optical switch;

determining one or more faults using stored provisioning information and alarm information;

transmitting, toward other nodes via said control channel, information including said one or more determined faults, LOS channel defect information and any provisioning updates, and for further determining whether any channel is associated with one or more of a channel not added fault, a channel not dropped fault and a channel not through connected fault, wherein any determined channel not added fault, channel not dropped fault and channel not through connected fault is included within said information transmitted toward neighborhood nodes via said control channel.

* * * * *